(12) United States Patent
Slapak

(10) Patent No.: US 10,072,734 B2
(45) Date of Patent: Sep. 11, 2018

(54) GEARBOX FOR VEHICLES AND VEHICLE, COMPRISING SUCH A GEARBOX

(71) Applicant: SCANIA CV AB, Södertälje (SE)

(72) Inventor: Dieter Slapak, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/302,430

(22) PCT Filed: May 12, 2015

(86) PCT No.: PCT/SE2015/050527
§ 371 (c)(1),
(2) Date: Oct. 6, 2016

(87) PCT Pub. No.: WO2015/183154
PCT Pub. Date: Dec. 3, 2015

(65) Prior Publication Data
US 2017/0023105 A1    Jan. 26, 2017

(30) Foreign Application Priority Data
May 27, 2014 (SE) ........................................ 1450627

(51) Int. Cl.
*F16H 3/54* (2006.01)
*F16H 37/04* (2006.01)
(Continued)

(52) U.S. Cl.
CPC ............. *F16H 3/54* (2013.01); *F16H 37/046* (2013.01); *F16H 1/30* (2013.01); *F16H 3/68* (2013.01);
(Continued)

(58) Field of Classification Search
CPC ..... F16H 1/30; F16H 3/54; F16H 3/68; F16H 37/046; F16H 2200/0034;
(Continued)

(56) References Cited

U.S. PATENT DOCUMENTS 2,686,978 A    8/1954   Herbster
2,941,423 A    6/1960   Armington et al.
(Continued)

FOREIGN PATENT DOCUMENTS

CN    201053478 Y    4/2008
DE    1153633 B    8/1963
(Continued)

OTHER PUBLICATIONS

International Search Report for PCT/SE2015/050527 dated Sep. 21, 2015.
(Continued)

*Primary Examiner* — Ramya Prakasam Burgess
*Assistant Examiner* — David R Morris
(74) *Attorney, Agent, or Firm* — Moore & Van Allen PLLC; W. Kevin Ransom

(57) ABSTRACT

A gearbox is provided comprising a planetary gearbox with a ring gear, sun wheel and planetary wheel carrier, on which at least one planetary wheel is mounted in a rotatable manner and is engaged via teeth with the ring gear and sun wheel; a first axially shiftable coupling sleeve, which in first gear position disconnects an input shaft to the gearbox from the planetary wheel carrier, and in a second gear position connects the input shaft with the planetary wheel carrier; and a second axially shiftable coupling sleeve, which in the first gear position connects a gearbox house surrounding the planetary gearbox with the ring gear, and in the second gear position disconnects the gearbox house from the ring gear. An axial stop, mounted on the planetary wheel carrier, abuts against and is connected with the ring gear and prevents the ring gear from shifting axially.

20 Claims, 3 Drawing Sheets

(51) Int. Cl.
 *F16H 3/68* (2006.01)
 *F16H 1/30* (2006.01)
(52) U.S. Cl.
 CPC ............ *F16H 2200/0034* (2013.01); *F16H 2200/2005* (2013.01); *F16H 2200/2035* (2013.01); *F16H 2200/2064* (2013.01); *F16H 2200/2094* (2013.01)
(58) Field of Classification Search
 CPC ..... F16H 2200/2005; F16H 2200/2035; F16H 2200/2064; F16H 2200/2094
 See application file for complete search history.

(56) References Cited

U.S. PATENT DOCUMENTS

| | | | |
|---|---|---|---|
| 3,477,314 A * | 11/1969 | Rutkowski | F16H 3/54 475/296 |
| 4,215,593 A | 8/1980 | Shono et al. | |
| 4,805,484 A | 2/1989 | Hiraiwa | |
| 6,196,944 B1 | 3/2001 | Schmitz | |
| 6,406,400 B1 | 6/2002 | Shih | |
| 9,085,227 B2 | 7/2015 | Fournier et al. | |
| 2007/0042854 A1 * | 2/2007 | Edelson | F16H 3/56 475/149 |
| 2008/0032846 A1 | 2/2008 | Heinzelmann | |
| 2010/0267508 A1 | 10/2010 | Hvolka et al. | |
| 2012/0088628 A1 | 4/2012 | Ziemer et al. | |
| 2014/0011618 A1 | 1/2014 | Atarashi et al. | |
| 2014/0046555 A1 * | 2/2014 | Slapak | B60K 17/28 701/53 |
| 2014/0162825 A1 | 6/2014 | Sugimoto | |
| 2015/0226297 A1 | 8/2015 | Knoblauch et al. | |
| 2016/0003351 A1 * | 1/2016 | Park | F16H 3/54 475/153 |
| 2017/0089429 A1 * | 3/2017 | Slapak | F16H 3/54 |
| 2017/0089437 A1 * | 3/2017 | Arnelof | F16H 37/042 |

FOREIGN PATENT DOCUMENTS

| | | |
|---|---|---|
| DE | 4121709 A1 | 1/1992 |
| FR | 1360006 A | 4/1964 |
| GB | 1045972 A | 10/1966 |
| GB | 1294548 A | 11/1972 |
| GB | 2103735 A | 2/1983 |
| JP | 361002954 A | 8/1986 |
| KR | 19970003587 | 1/1997 |
| SE | 439969 B | 7/1985 |
| WO | 0155620 A1 | 8/2001 |
| WO | 2014005774 A1 | 1/2014 |

OTHER PUBLICATIONS

Written Opinion of the International Search Authority for PCT/SE2015/050527 dated Sep. 21, 2015.
European Search Report for European Application No. 15799287.6 dated Jan. 22, 2018.
Korean Office Action for Korean Patent Application No. 10-2016-7035366 dated Mar. 28, 2018.

* cited by examiner

GEARBOX FOR VEHICLES AND VEHICLE, COMPRISING SUCH A GEARBOX

CROSS-REFERENCE TO RELATED APPLICATION(S)

This application is a national stage application (filed under 35 § U.S.C. 371) of PCT/SE15/050527, filed May 12, 2015 of the same title, which, in turn claims priority to Swedish Application No. 1450627-3, filed May 27, 2014 of the same title; the contents of each of which are hereby incorporated by reference.

FIELD OF THE INVENTION

The present invention relates to a gearbox for vehicles.

BACKGROUND OF THE INVENTION

For vehicles, and in particular heavy goods vehicles such as trucks, a gearbox, also called a range gearbox, is often connected to the main gearbox with the objective of doubling the number of potential gearings. Such an additional gearbox usually comprises a planetary gear, which has a low and a high gear with which the gear possibilities of the main gearbox may be divided into a low range position and a high range position. In the low range position, a gear reduction occurs through the planetary gear, and in the high range position the gear ratio is 1:1 in the planetary gear.

The range gearbox is arranged between the main gearbox and a propeller shaft connected to the driving wheels of the vehicle. The range gearbox is housed in a gearbox housing and comprises an input shaft connected to the main gearbox, an output shaft and a planetary gear arranged between the input shaft and the output shaft. The planetary gear usually comprises three components, which are arranged in a rotatable manner in relation to each other, namely a sun wheel, a planetary wheel carrier with a planetary wheel and a ring gear. With knowledge about the number of teeth in the sun wheel and the ring gear, the mutual rotational speeds of the three components may be determined during operation. In a range gearbox, the sun wheel may be connected in a twist-fast manner with the input shaft, with a number of planetary wheels that engage with said sun wheel, which planetary wheels are mounted in a rotatable manner on the planetary wheel carrier, which is connected in a twist-fast manner with the output shaft, and with an axially shiftable ring gear, which envelops and engages with the planetary wheels. The teeth of the sun wheel, the planetary wheels and the ring gear may be oblique, i.e. they have an angle in relation to the rotational axis common to the sun wheel, the planetary wheel carrier and the ring gear. By cutting the teeth obliquely, the noise emitted from the planetary gear is reduced. However, a reaction force in the direction of the rotational axis is obtained from the cogwheels comprised in the planetary gear. The direction of the reaction force is dependent on the direction in which the cogwheels in the planetary gear are obliquely cut. Thus the reaction forces may operate backwards or forwards along the extension of the rotational axis.

In a prior art range gearbox, low and high gears are achieved by axial sliding of the ring gear between the low range position, in which the ring gear is rotation-locked in relation to the gearbox housing, and the high range position, in which the ring gear is rotatable in relation to the gearbox housing and where the ring gear, the planetary wheels and the sun wheel rotate as one continuous unit. The planetary gear comprises two coupling rings arranged on each side of the ring gear, and two synchronisation rings arranged on each side of the ring gear. The synchronisation rings are adapted to achieve synchronous gear shifting.

In order to achieve a good synchronising function in this type of range gearbox, the surface of the synchronisation ring's teeth, which faces the ring gear and which is intended to receive the ring gear's teeth on synchronisation, must have an angle—a so-called locking angle in relation to the synchronisation ring's rotational axis, which locking angle must be balanced against the braking torque that the synchronisation ring transfers to the ring gear, in order to achieve a synchronous rotational speed. This means that said locking angle must be adapted so that the teeth on the synchronisation ring abut against those parts of the ring gears' teeth that are equipped with a locking angle, and so that they impact sufficiently on the ring gear in order for a synchronous rotational speed to be achieved and so that they, subsequently, are released from those parts of the ring gear's teeth that are equipped with the locking angle, which happens when the ring gear is to engage with the relevant coupling ring, after the synchronous rotational speed has been achieved. In order to secure that a synchronous rotational speed is obtained before the ring gear goes past the synchronisation ring in an axial direction, the teeth of the synchronisation ring must not let go of the ring gear's teeth too easily.

After the synchronisation ring's teeth have been released from the ring gear's teeth, when a synchronous rotational speed has been achieved between the ring gear and the coupling ring, the ring gear will be shifted axially, so that the synchronisation ring is inserted in the ring gear and remains in an axial position in relation to the ring gear, which axial position is determined by the position where the synchronisation ring meets and abuts against the planetary wheels of the planetary gear.

The ring gear's freedom of movement in an axial direction is limited by the geometrical design of the teeth of the ring gear and the coupling ring. At the ring gear's axial ends, end surfaces at the tips of the ring gear's teeth meet and abut a circumferential end surface of each coupling ring, which entails that the ring gear may not be shifted in an axial direction.

The document WO0155620 shows a synchronisation device at a planetary gear, wherein the planetary gear comprises a sun wheel, a planetary wheel carrier and a ring gear. The sun wheel is connected in a twist-fast manner with the input shaft, and a number of planetary wheels engage with the sun wheel, which planetary wheels are rotatably mounted on a planetary wheel carrier, connected in a twist-fast manner with an output shaft. An axially shiftable ring gear envelops and engages with the planetary wheels. The low and high gears of the gearbox are obtained by the ring gear being shifted axially between the low range position and the high range position.

These synchronisation devices are, however, subjected to wear and result in considerable costs of repair. If the range gearbox transfers large torques, the synchronisation devices will have considerable dimensions, entailing increased weight, increased space requirement and increased moment of inertia. When the high range position is connected, the torque will be transferred from the sun wheel to the planetary wheels, entailing that facets may form on the cog flanks of the sun wheel, which creates noise in the gearbox and accelerates wear of the planetary gear's cogwheels.

There are range gearboxes, in which the synchronisation devices are replaced with splined coupling sleeves. By controlling the transmission in such a way that a synchronous rotational speed arises between the two components that are to be connected, an axial shift of the coupling sleeve is facilitated along the two components, with the objective of connecting and interconnecting these. When the components are to be disconnected from each other, the transmission is controlled in such a way that torque balance arises between the components, meaning that the coupling sleeve does not transfer any torque. It then becomes possible to displace the coupling sleeve along the components with the objective of disconnecting them from each other.

Torque balance relates to a state where a torque acts on an internal ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the internal ring gear or planetary wheel carriers, are connected with a clutch device, this clutch device does not transfer any torque between the planetary gear's parts when torque balance prevails. Accordingly, the clutch device may easily be shifted and the planetary gear's component parts may be disconnected.

The document U.S. Pat. No. 6,196,944 shows a planetary gear, comprising a sun wheel, a planetary wheel carrier with planetary wheels and a ring gear. The sun wheel may, via a coupling sleeve, be connected in a twist-fast manner with the input shaft in a low range position and be disconnected from the input shaft in a high range position. In the high range position, the input shaft is connected with the planetary wheel carrier via the same coupling sleeve. The ring gear is fixedly connected with a gearbox house. The prior art planetary gear is arranged inside a supplemental gearbox, which has only two gear positions.

Prior art gearboxes must often be completely dismantled when a component is replaced, which means that it takes a lot of time and that it is costly to repair the gearbox.

SUMMARY OF THE INVENTION

Despite prior art solutions, there is a need to further develop a gearbox with short shift times, wherein the reliability and operational security of the transmission is high, and wherein all component parts of the transmission are used efficiently, so that low energy is required when shifting gears. There is also a need to further develop a gearbox with small dimensions in relation to potential torque transmission, and a gearbox with low axial forces acting on the main shaft's axial bearings. There is also a desire to reduce fuel consumption in a vehicle comprising the gearbox, and to reduce noise from the gearbox, and a need to further develop a gearbox that is easy to repair.

The objective of the present invention is to provide a gearbox, which allows short shifting times.

Another objective of the present invention is a gearbox allowing for high reliability and operational security of the gearbox.

Another objective of the invention is to provide a gearbox, which uses all component parts in the transmission efficiently.

Another objective of the invention is to provide a gearbox having small dimensions in relation to possible torque transmission.

Another objective of the invention is to provide a gearbox that reduces fuel consumption in a vehicle comprising the gearbox.

Another objective of the present invention is to provide a gearbox that requires low energy on shifting.

Another objective of the invention is to provide a gearbox that has a low noise level.

Another objective of the invention is to provide a gearbox that is easy to repair.

Another objective of the invention is to provide a gearbox, with low axial forces acting on the axial bearings of the gearbox.

Since the first axially shiftable coupling sleeve transmits torque from the input shaft to the planetary wheel carrier and further to the output shaft in the second gear position, and since the second axially shiftable coupling sleeve locks the ring gear with the gearbox house, so that torque is transmitted from the input shaft via the ring gear and the planetary wheel carrier to the output shaft in the first gear position, an efficient gearbox with a high efficiency and low losses is obtained. The gearbox will have a reduced need for lubrication while facet damage in the cogwheel flanks is minimized.

The axial stroke of each respective coupling sleeve becomes shorter, compared to the stroke of the ring gear in a traditional range gearbox, which entails that shifting between different gears is quick.

The first and the second coupling sleeve may be adapted with a limited longitudinal extension, which means that the mass of each respective coupling sleeve is low. The low mass of each coupling sleeve entails that shifting between different gears is quick.

According to the invention, the gearbox comprises an axial stop, mounted on the planetary wheel carrier, which stop abuts against and is connected with the ring gear, the axial stop preventing the ring gear from being shifted axially. Thus, the ring gear's axial position will be fixed. By fixing the ring gear's axial position via an axial stop, the wear of the second coupling sleeve is minimized, so that the cogwheels of the planetary gearbox may be equipped with either spur teeth or oblique teeth, and so that the coupling sleeves may be equipped with either spur splines or oblique splines.

According to one embodiment of the invention, the second axially shiftable coupling sleeve is only connected with the gear house in the second gear position. The second coupling sleeve will thus not give rise to inertia forces in the gearbox.

According to one embodiment of the invention, the input shaft is connected with the sun wheel, and the planetary wheel carrier is connected with an output shaft in the gearbox. Thus, the gearbox has a simple construction, with few components.

According to one embodiment of the invention, the input shaft is connected with the sun wheel via a splines joint having an axial extension, which allows for an angular shift between the input shaft and the shaft of the sun wheel. During operation, the main shaft in the main gearbox will be bent under certain operating conditions. Thanks to the allowed angular shift in the splines joint, the sun wheel will not be impacted by the bend in the main shaft, which reduces the stress on the sun wheel's teeth. The splines joint entails that the planetary gearbox may be fitted and dismantled on the input shaft in one piece. Accordingly, repair costs may be reduced, since the time required for repairs is reduced.

According to one embodiment of the invention, the first axially shiftable coupling sleeve is equipped with first splines on an inner surface, which splines are arranged to interact with corresponding first splines, arranged on the input shaft and the planetary wheel carrier. A simple and effective connection and disconnection of the input shaft and the planetary wheel carrier is thus obtained.

According to one embodiment of the invention, the second axially shiftable coupling sleeve is equipped with second splines on an inner surface, which splines are arranged to interact with corresponding second splines, arranged on the ring gear and on the gearbox house. A simple and effective connection and disconnection of the ring gear and the gearbox house is thus obtained.

According to one embodiment of the invention the number of splines on the first sleeve differs from the number of teeth on the ring gear. Thus, a large number of determined locked positions between the second coupling sleeve and the ring gear is obtained, which entails that a large number of facets may be formed on the cogwheels' tooth flanks. The facets will, however, lie close to each other, so that they together are perceived as a mainly even surface of the tooth flanks. The optimal number of splines may be calculated, in order to obtain as many facets as possible. However, according to the invention, the planetary wheels' cog flanks will not be subjected to large stresses in the second gear position. Accordingly, the risk of facets forming is minimized.

According to one embodiment of the invention, the ring gear's, the sun wheel's and at least one planetary wheel's cogwheels are adapted as oblique cogs, and extend at an angle in relation to the central shaft of the respective wheels. Thus, a gearbox with a large torque transmission and a low noise level is obtained.

Other advantages of the invention are set out in the detailed description below.

BRIEF DESCRIPTION OF THE DRAWINGS

Below is a description, as an example, of preferred embodiments of the invention with reference to the enclosed drawings, in which.

DETAILED DESCRIPTION OF PREFERRED EMBODIMENTS OF THE INVENTION

Figure 1:
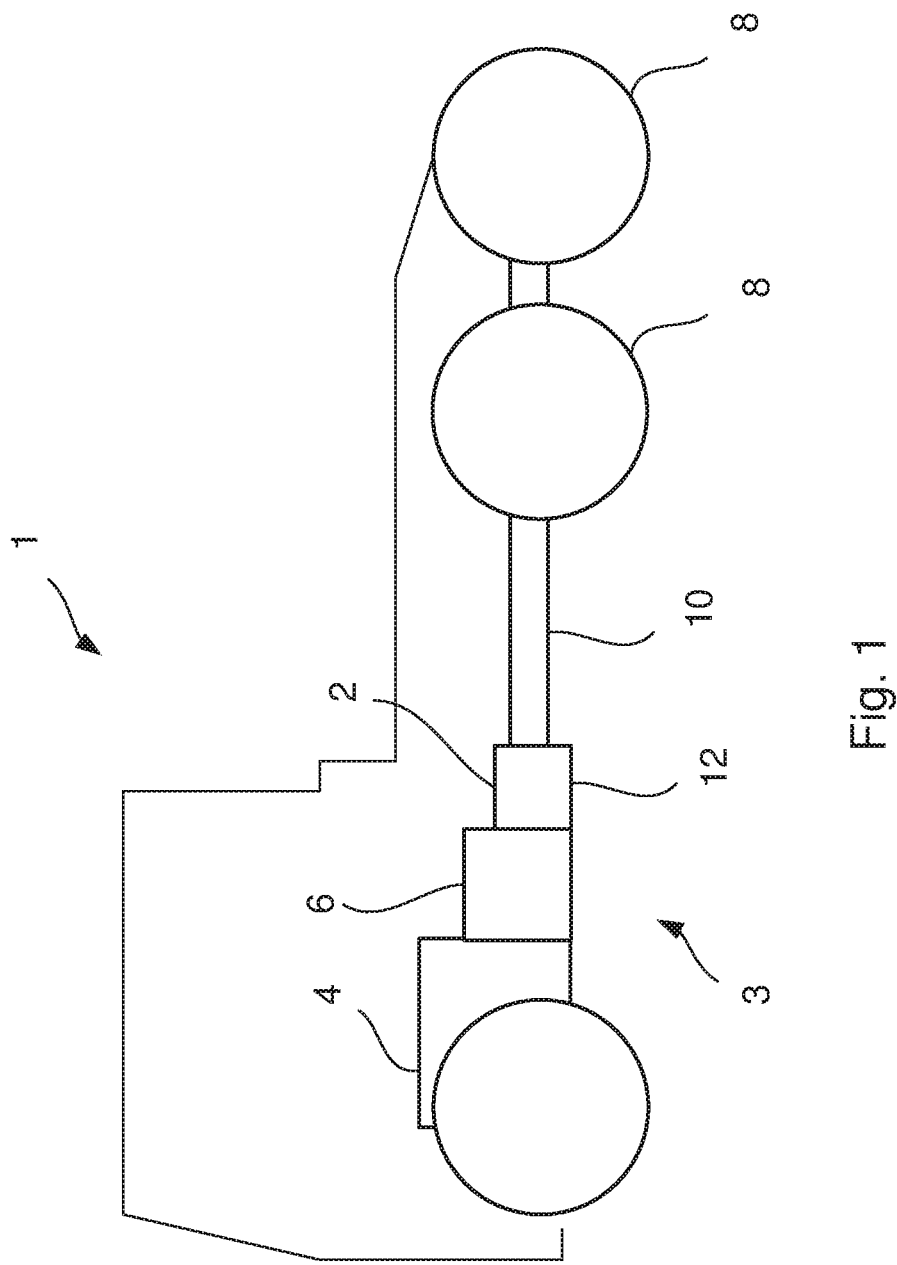
FIG. 1 shows a side view of a vehicle with a gearbox according to the present invention.

FIG. 1 shows a side view of a vehicle 1, e.g. a truck, which comprises a gearbox 2 according to the present invention. The gearbox 2 is comprised in a transmission 3, which comprises a combustion engine 4, a main gearbox 6 and a propeller shaft 10. The combustion engine 4 is connected to a main gearbox 6, which in turn is connected to the gearbox 2 according to the present invention. The gearbox 2 is also connected to the driving wheels 8 of the vehicle 1, via the propeller shaft 10. The gearbox 2 according to the present invention is also called a range gearbox, and its objective is to double the number of gearing possibilities. The gearbox 2 is surrounded by a gearbox housing 12.

Figure 2:
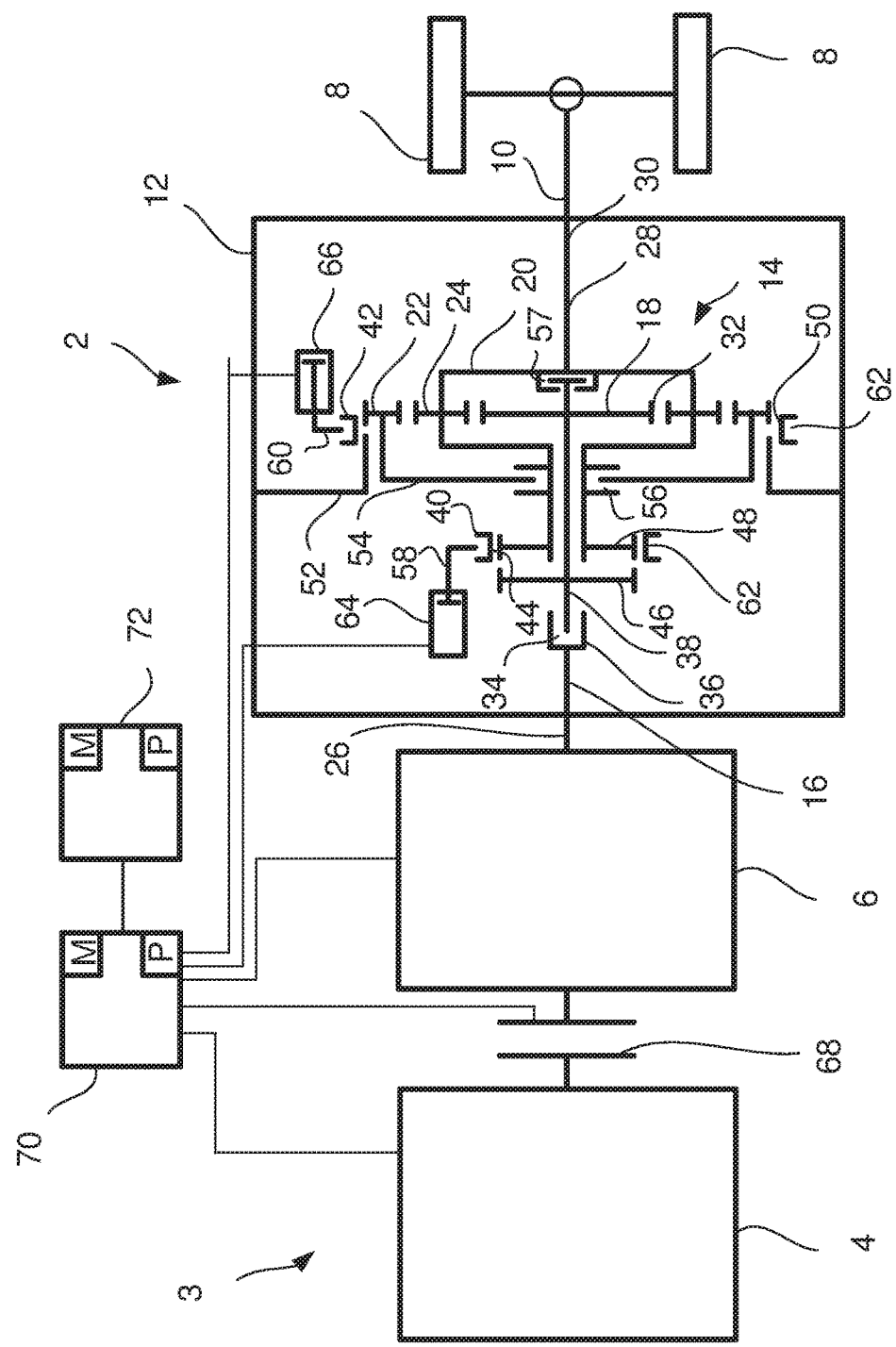
FIG. 2 shows a schematic section view of the gearbox according to the invention in a low range position.

FIG. 2 shows a schematic sectional view of a gearbox 2 according to the present invention. The gearbox 2 usually comprises a planetary gear 14, which has a low and a high gear, with which the main gearing possibilities of the gearbox 6 may be divided into a low range position and a high range position. In a first gear position, which corresponds to the low range position, a down shift occurs via the planetary gear 14. In the high range position, the gearing ratio is 1:1 in the planetary gear 14. FIG. 2 shows the gearbox 2 in the first gear position, corresponding to the low gear or the low range position.

The gearbox 2 is housed in a gearbox housing 12 and comprises an input shaft 16, which may consist of a main shaft 26 in the main gearbox 6. The planetary gear 14 comprises three main components, which are arranged in a rotatable manner in relation to each other, namely a sun wheel 18, a planetary wheel carrier 20 and a ring gear 22. On the planetary wheel carrier 20, a number of mounted planetary wheels 24 are arranged. The output shaft 28 of the gearbox 2 is also arranged in a twist-fast manner on the planetary wheel carrier 20. The output shaft 28 is connected to the propeller shaft 10 of the vehicle 1. With knowledge about the number of teeth 32 in the sun wheel 18 and the ring gear 22, the relative rotational speeds of the three components may be determined during operation. The sun wheel 18 is connected in a twist-fast manner with the input shaft 16 and the planetary wheels 24 engage in the said sun wheel 18. The ring gear 22 envelops and engages in the planetary wheels 24. The teeth 32 of the sun wheel 18, the planetary wheels 24 and the ring gear 22 may be oblique, i.e. they may have an angle in relation to the rotational axis 30, common to the sun wheel 18, the planetary wheel carrier 20 and the ring gear 22. By cutting the teeth 32 obliquely, a reaction force in the direction of the rotational axis 30 is obtained from the cogwheels 18, 22, 24 comprised in the planetary gear 14. The direction of the reaction force is dependent on in which direction the teeth 32 in the planetary gear 14 are cut obliquely. Thus the reaction forces may operate backwards or forwards along the extension of the rotational axis 30.

The input shaft 16 is preferably connected with the sun wheel 18 via a splines joint 34 having an axial extension, allowing for an angular shift between the input shaft 16 and the shaft 38 of the sun wheel 18. During operation, the main shaft 26 of the main gear box 6 will, because of its elasticity and damping characteristics, bend under certain operating conditions and considerable stress. When the stress on the main shaft 26 drops, the main shaft 26 will revert to its original shape. The input shaft 16 is equipped, at its end, with a sleeve 36, which interacts internally with the circumference of a section of the shaft 38 of the sun wheel 18, via the splines joint 34. Thanks to the allowed angular shift in the splines joint 34, the sun wheel 18 will not be impacted by the bend in the main shaft 26, which reduces the stress on the teeth 32 of the sun wheel 18. The splines joint 34 entails that the planetary gear 14 may be fitted and dismantled on the input shaft 16 in one piece. Accordingly, repair costs may be reduced, since the time required for repairs is reduced.

A first axially shiftable coupling sleeve 40 is arranged to disconnect an input shaft 16 to the gearbox 2 from the planetary wheel carrier 20 in the first gear position, and is arranged to connect the input shaft 16 with the planetary wheel carrier 20 in the second gear position. A second axially shiftable coupling sleeve 42 is arranged to connect the gearbox house 12 surrounding the planetary gearbox 14 with the ring gear 22 in the first gear position, and is arranged to disconnect the gearbox house 12 from the ring gear 22 in the second gear position.

The first axially shiftable coupling sleeve 40 is equipped with first splines 44 on an inner surface, which splines are arranged to interact with corresponding splines 44, arranged on the input shaft 16 and the planetary wheel carrier 20. The corresponding first splines 44 arranged on the input shaft 16, are arranged on the periphery of a first rim 46, which is fitted in a twist-fast manner on the input shaft 16. The corresponding first splines arranged on the planetary wheel carrier 20, are arranged on the periphery of a second rim 48, which is fitted in a twist-fast manner on the planetary wheel carrier 20.

The number of first splines 44 on the first axially shiftable coupling sleeve 40 and on the input shaft 16 preferably exceeds the number of teeth 32 on the ring gear 22. Thus, a large number of determined locked positions between the first coupling sleeve 40 and the ring gear 22 is obtained, which entails that a large number of facets may be formed on the tooth flanks 32 of the cogwheels 18, 22, 24. The facets will, however, lie close to each other, so that they together are perceived as a mainly even surface of the teeth 32. The facets therefore do not impact the function of the gearbox 2 and have no significant impact on the service life of the cogwheels 18, 22, 24.

The second axially shiftable coupling sleeve 42 is equipped with second splines 50 on an inner surface, which splines are arranged to interact with corresponding second splines 50, arranged on the periphery of the ring gear 22, and on a protrusion 52, which is fixedly connected with the gearbox house 12.

An axial stop 54, mounted on the planetary wheel carrier 20, is arranged to abut against the ring gear 22, which axial stop 54 prevents the ring gear 22 from being shifted axially. The axial stop 54 may consist of a disc-shaped plate, which by means of first axial bearing 56 is mounted on the planetary wheel carrier 20. The axial stop 54 is rotatable in relation to the planetary wheel carrier 20 and the input shaft 16, and follows the rotation of the ring gear 22. The axial stop 54 entails that the ring gear 22 is fixed axially, and that the gearbox's 2 axial bearing of the input shaft 16 is subjected to less stress, when the cogwheels 18, 22, 24 are equipped with oblique teeth. A second axial bearing 57 may be arranged between the shaft 38 of the sun wheel 18 and the planetary wheel carrier 20, in order to absorb axial forces arising in the sun wheel 18.

The gearbox's 2 low gear is obtained by way of axial shifting of the first coupling sleeve 40, in order to disconnect the planetary wheel carrier 20 from the input shaft 16, at the same time as, or in close connection with, shifting of the second coupling sleeve 42, so that the ring gear 22 is connected to the gearbox house 12. The axial shifting of the first and second sleeve 40, 42 is achieved with a first and second shift fork 58, 60, which are arranged in a circumferential groove 62 on the outside of the respective first and second coupling sleeves 40, 42. The first shift fork 58 is impacted by a first power element 64, and the second shift fork 60 is impacted by a second power element 66. The first and second power elements 64, 66 may consist of a pneumatic or a hydraulic cylinder. The first and second shift forks 58, 60 and the first and second power elements 64, 66 are schematically drawn in FIG. 2.

Preferably, the respective sleeves 40, 42 have a small mass, which entails that low energy and power is spent in moving the respective sleeves 40, 42 when shifting gears. Thus a quick shifting may be carried out between the different gear positions in the gearbox 2 during a short time.

Figure 3:
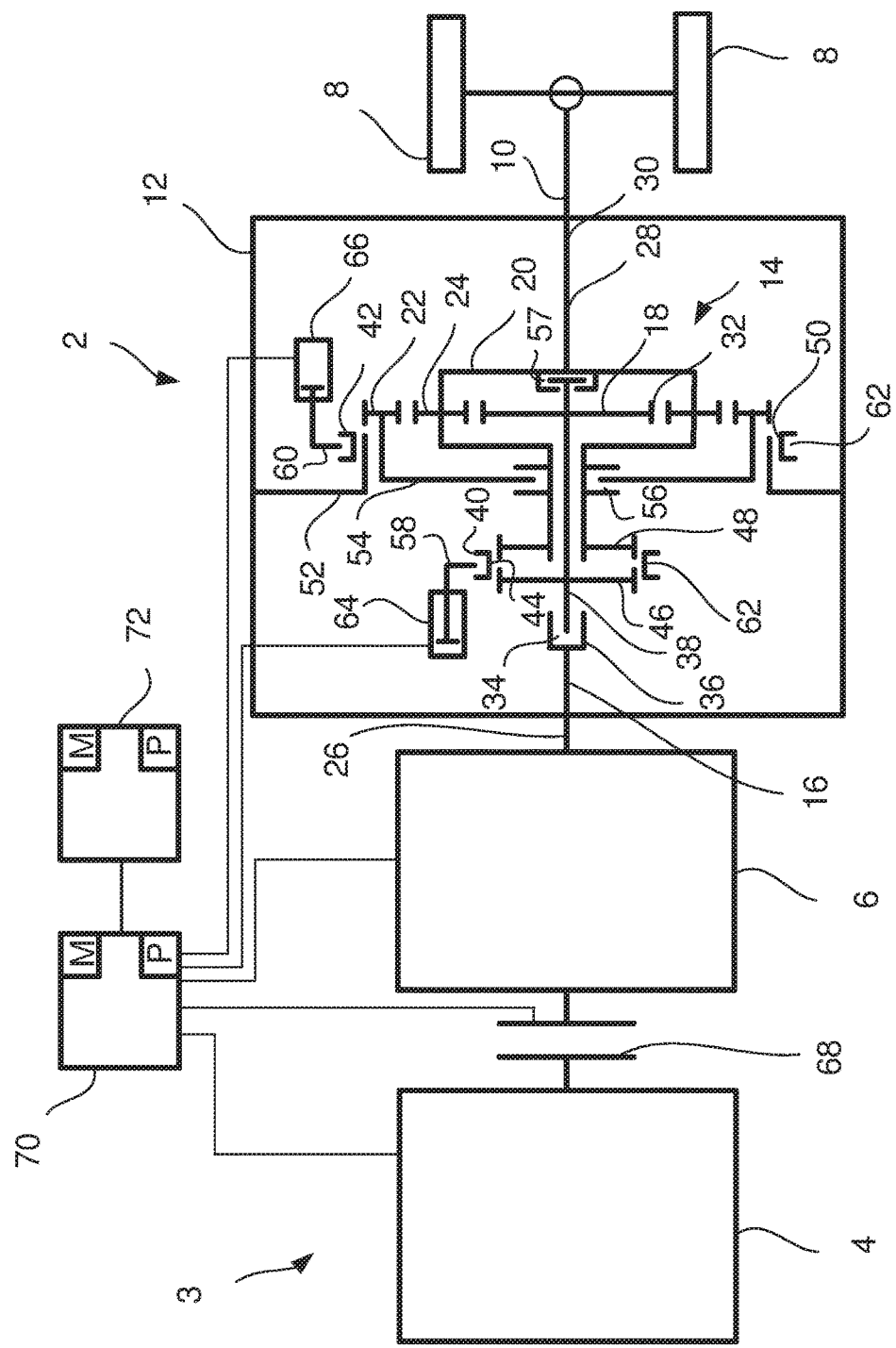
FIG. 3 shows a schematic section view of the gearbox according to the invention in a high range position.

FIG. 3 shows a section view of the gearbox 2 according to the invention, in the second gear position or the high range position, in which the first coupling sleeve 40 has been shifted to the left in FIG. 3, in order to connect the input shaft 16 with the planetary wheel carrier 20. The second coupling sleeve 42 has been shifted to the left in FIG. 3, in order to disconnect the ring gear 22 from the gearbox house 12. The second coupling sleeve 42 will accordingly be connected only with the gearbox house 12, which means that the second coupling sleeve 42 comes to a standstill, and will not impact inertia forces in the main gearbox 6 at the rotation of the ring gear 22. Torque transmission from the input shaft 16 to the output shaft 28 therefore takes place via the input shaft 16 and the planetary wheel carrier 20, and further to the output shaft 28, so that the gearing ratio through the planetary gear 14 becomes 1:1.

The gearbox 2 according to the invention functions as follows in connection with shifting from the first to the second gear position, that is to say from the low range position to the high range position, and will be described in connection with FIGS. 2 and 3. In FIG. 2, the gearbox 2 has been shifted to the low range position, which means that the first coupling sleeve 40 has been moved to a position that disconnects the input shaft 16 from the planetary wheel carrier 20. The first coupling sleeve 40 will not impact the mass inertia forces of the main gearbox 6 when the input shaft 16 rotates. The second coupling sleeve 42 has been moved to a position that connects the ring gear 22 with the gearbox house 12. Thus, the gearbox 2 operates in the low range position, at which a down-shift occurs through the planetary gear 14. The shifting process from the low range position to the high range position occurs by way of disconnection of the second coupling sleeve 42 from the first ring gear 22, when torque transmission between the ring gear 22 and the gearbox house 12 ceases, which is achieved through disconnection of the combustion engine 4 from the main gearbox 6, via a clutch 68 arranged in between. Alternatively, the combustion engine 4 is controlled in such a way that torque balance between the ring gear 22 and the gearbox house 12 is generated. When the second coupling sleeve 42 no longer transmits any torque, the axial shift of the second coupling sleeve 42 is facilitated. Simultaneously, or after a predetermined time period, the first coupling sleeve 40 must be shifted by the first shift fork 58, in order to connect the planetary wheel carrier 20 with the input shaft 16. This is achieved by controlling the combustion engine 4 in such a way that the input shaft 16 rotates at a rotational speed adapted to the planetary wheel carrier's 20 speed. When the input shaft 16 and the planetary wheel carrier 20 rotate with the same speed, the first coupling sleeve 40 may engage with the first splines 44, adapted on the input shaft 16. Accordingly, the gearbox 2 operates in the high range position.

In order to shift to a low range position, the first coupling sleeve 40 must be shifted by the first shift fork 58, to the right in FIG. 3, in order to disconnect the planetary wheel carrier 20 from the input shaft 16. This is facilitated by ceasing the torque transmission between the input shaft 16 and the planetary wheel carrier 20, which is achieved by way of disconnecting the combustion engine 4 from the main gearbox 6, via the clutch 68. Alternatively, the combustion engine 4 is controlled in such a way that torque balance between the input shaft 16 and the planetary wheel carrier 20 is generated. When the first coupling sleeve 40 no longer transmits any torque, the axial shift of the first coupling sleeve 40 is facilitated. At the same time, or after a predetermined time period, the second sleeve 42 must be shifted by the second shift fork 60 in a direction towards the ring gear 22, in order to connect the ring gear 22 with the gearbox house 12. Since the second coupling sleeve 42 is at a standstill, the ring gear 22 must be brought to a standstill position before the connection between the second coupling sleeve 42 and the ring gear 22 occurs. This is achieved by controlling the combustion engine 4 in such a way that the input shaft 16 rotates at a speed which is adapted to the rotational speeds of the planetary wheel carrier 20 and the planetary wheel 24, entailing that the ring gear 22 will remain at a standstill. When the ring gear 22 is at a standstill, the second coupling sleeve 42 may engage with the second splines 50, adapted on the ring gear 22. Thus, the gearbox 2 operates in the low range position, at which a down-shift occurs via the gearbox 2.

An electronic control device 70 is connected to the gearbox 2, the main gearbox 6, the combustion engine 4 and the clutch 68, in order to carry out the gear steps above. Preferably a number of non-displayed speed sensors in the gearbox 2, the main gearbox 6 and the combustion engine 4 may be connected to the control device. Another computer 72 may also be connected to the control device 70. The control device 70 may be a computer with software suitable for this purpose. The control device 70 and/or the computer 72 comprise a computer program P, which may comprise procedures to control the gearbox 2 according to the present invention. The program P may be stored in an executable manner, or in a compressed manner, in a memory M and/or a read/write memory R. Preferably, a computer program product is provided, comprising program code stored in a medium readable by a computer, in order to perform the gear steps specified above, when said program code is executed in the control device 70, or in another computer 72, connected to the control device 70. Said program code may be stored in a non-volatile manner on said computer-readable medium.

The above described gearbox 2 is advantageous from a manufacturing and assembly point of view, since the required processing of component parts is simple, and the number of component parts small. The design is such that the need for space in an axial as well as in a radial direction is small. The described gearbox 2 may also be used in other contexts than those described above. Thus, it is possible to use it for e.g. hydraulic automatic gearboxes, where several gearboxes with planetary gears are connected with each other.

According to one embodiment of the invention, it is possible to arrange a first coupling ring (not displayed) and at least one first synchronisation ring (not displayed) between the first coupling sleeve 40 and the planetary wheel carrier 20, which first coupling sleeve 40 is arranged to be connected with the first coupling ring in the first gear position. Accordingly, a mechanical synchronisation between the input shaft 16 and the planetary wheel carrier 20 may be achieved. Similarly, a second coupling ring (not displayed) and at least one second synchronisation ring (not displayed) may be arranged between the second coupling sleeve 42 and the ring gear 22, which second coupling sleeve 42 is arranged to be connected with the first coupling ring (not displayed) in the first gear position. Accordingly, a mechanical synchronisation may be achieved between the ring gear 22 and the gearbox house 12. The function of the gearbox 2 according to this embodiment functions in the same way as with the coupling sleeves 40, 42 without synchronisation, but instead of generating torque balance with the combustion engine 4, and ceasing torque transmission by disconnecting the combustion engine 4, the coupling rings and the synchronisation rings will ensure that the connection and disconnection of the input shaft 16 and the planetary wheel carrier 20, and of the internal ring gear 22 and the gearbox house 12, respectively, is possible.

The components and features specified above may within the framework of the invention be combined between different embodiments specified.

The invention claimed is:

1. A gearbox for a vehicle, comprising a planetary gear with a ring gear, a sun wheel and a planetary wheel carrier, on which at least one planetary wheel is mounted in a rotatable manner, which ring gear and sun wheel engage with the at least one planetary wheel through teeth;
   - a first axially shiftable coupling sleeve, which is arranged to disconnect an input shaft to the gearbox from the planetary wheel carrier in a first gear position, and to connect the input shaft with the planetary wheel carrier in a second gear position;
   - a second axially shiftable coupling sleeve is arranged to connect a gearbox house surrounding the planetary gearbox with the ring gear in the first gear position, and to disconnect the gearbox house from the ring gear in the second gear position; and
   - an axial stop, mounted via a first axial bearing on the planetary wheel carrier, abuts against and is connected with the ring gear, which axial stop prevents the ring gear from shifting axially.

2. A gearbox according to claim 1, wherein the second axially shiftable coupling sleeve is connected with the gearbox house in the second gear position.

3. A gearbox according to claim 1, wherein the input shaft is connected with the sun wheel, and in the planetary wheel carrier is connected with an output shaft in the gearbox.

4. A gearbox according to claim 1, wherein the input shaft is connected with the sun wheel via a splines joint, which has an axial extension, allowing for an angular shift between the input shaft and a shaft of the sun wheel.

5. A gearbox according to claim 1, wherein the first axially shiftable coupling sleeve is equipped with first splines on an inner surface, which splines are arranged to interact with corresponding first splines, arranged on the input shaft and the planetary wheel carrier.

6. A gearbox according to claim 1, wherein the second axially shiftable coupling sleeve is equipped with second splines on an inner surface, which splines are arranged to interact with corresponding second splines, arranged on the ring gear and on the gearbox house.

7. A gearbox according to claim 6, wherein the number of first splines on the first axially shiftable coupling sleeve and on the input shaft exceeds the number of teeth on the ring gear.

8. A gearbox according to claim 1, wherein the teeth of the ring gear, the sun wheel and the at least one planetary wheel are adapted as oblique teeth, and extend at an angle in relation to the rotational axis of the planetary gear.

9. A gearbox according to claim 1, wherein the gearbox is a range gearbox, and in the input shaft is connected to a main gearbox.

10. A gearbox according to claim 1, wherein the axial stop is rotatable in relation to the planetary wheel carrier via the first axial bearing and follows the rotation of the ring gear.

11. A gearbox according to claim 1 further comprising a second axial bearing arranged between a shaft of the sun wheel and the planetary wheel carrier.

12. A vehicle comprising a gearbox, said gearbox comprising:
   - a planetary gear with a ring gear, a sun wheel and a planetary wheel carrier, on which at least one planetary wheel is mounted in a rotatable manner, which ring gear and sun wheel engage with the at least one planetary wheel through teeth;

a first axially shiftable coupling sleeve, which is arranged to disconnect an input shaft to the gearbox from the planetary wheel carrier in a first gear position, and to connect the input shaft with the planetary wheel carrier in a second gear position;

a second axially shiftable coupling sleeve is arranged to connect a gearbox house surrounding the planetary gearbox with the ring gear in the first gear position, and to disconnect the gearbox house from the ring gear in the second gear position; and an axial stop, mounted via a first axial bearing on the planetary wheel carrier, abuts against and is connected with the ring gear, which axial stop prevents the ring gear from shifting axially.

13. A vehicle according to claim 12, wherein the second axially shiftable coupling sleeve is connected with the gearbox house in the second gear position.

14. A vehicle according to claim 12, wherein the input shaft is connected with the sun wheel, and in the planetary wheel carrier is connected with an output shaft in the gearbox.

15. A vehicle according to claim 12, wherein the input shaft is connected with the sun wheel via a splines joint, which has an axial extension, allowing for an angular shift between the input shaft and a shaft of the sun wheel.

16. A vehicle according to claim 12, wherein the first axially shiftable coupling sleeve is equipped with first splines on an inner surface, which splines are arranged to interact with corresponding first splines, arranged on the input shaft and the planetary wheel carrier.

17. A vehicle according to claim 12, wherein the second axially shiftable coupling sleeve is equipped with second splines on an inner surface, which splines are arranged to interact with corresponding second splines, arranged on the ring gear and on the gearbox house.

18. A vehicle according to claim 17, wherein the number of first splines on the first axially shiftable coupling sleeve and on the input shaft exceeds the number of teeth on the ring gear.

19. A vehicle according to claim 12, wherein the axial stop is rotatable in relation to the planetary wheel carrier via the first axial bearing and follows the rotation of the ring gear.

20. A vehicle according to claim 12 further comprising a second axial bearing arranged between a shaft of the sun wheel and the planetary wheel carrier.

* * * * *